United States Patent [19]

Hibino et al.

[11] Patent Number: 5,510,990
[45] Date of Patent: Apr. 23, 1996

[54] SYSTEM FOR DISTINGUISHING A VEHICLE TRAVELING AHEAD BASED ON AN ADJUSTABLE PROBABILITY DISTRIBUTION

[75] Inventors: Katsuhiko Hibino, Toyoake; Akira Kurahashi, Aichi; Mitsufumi Hashimoto, Shizuoka, all of Japan

[73] Assignee: Nippondenso Co., Ltd., Kariya, Japan

[21] Appl. No.: 162,276

[22] Filed: Dec. 7, 1993

[30] Foreign Application Priority Data

Dec. 8, 1992 [JP] Japan ..................... 4-328152

[51] Int. Cl.$^6$ .............................................. G06F 165/00
[52] U.S. Cl. ................... 364/426.04; 364/424.1; 364/431.03; 364/460; 364/461; 180/169; 180/271; 340/436
[58] Field of Search .................. 364/424.05, 426.01, 364/426.04, 460, 461, 424.1, 431.03, 431.04; 180/167, 169, 170, 271; 356/1, 3, 4, 5; 342/70, 72; 340/435, 436, 437

[56] References Cited

U.S. PATENT DOCUMENTS

| | | | |
|---|---|---|---|
| 3,952,301 | 4/1976 | Sorkin | 364/426.04 X |
| 4,621,705 | 11/1986 | Etoh | 180/169 |
| 4,622,636 | 11/1986 | Tachibana | 364/426.04 |
| 4,703,429 | 10/1987 | Sakata | 364/426.04 |
| 4,716,298 | 12/1987 | Etoh | 356/5 |
| 4,757,450 | 7/1988 | Etoh | 364/426.04 |
| 4,786,164 | 11/1988 | Kawata | 180/169 X |
| 5,173,859 | 11/1992 | Deering | 364/426.04 X |
| 5,214,408 | 5/1993 | Asayama | 180/169 X |
| 5,278,764 | 1/1994 | Iizuka et al. | 180/170 X |
| 5,304,980 | 4/1994 | Maekawa | 356/1 |

FOREIGN PATENT DOCUMENTS 60-169333   9/1985   Japan.
378596   12/1991   Japan.

Primary Examiner—Collin W. Park
Attorney, Agent, or Firm—Cushman Darby & Cushman

[57] ABSTRACT

An anticollision radar system for a vehicle is provided. This system includes a distance sensor for measuring distance to an object present in a given forward detectable range, and determines a curvature of a road on which the system vehicle is moving, determines the probability that the object present in a given forward detectable range of the distance sensor is identified as a preceding vehicle traveling on the same lane as the system vehicle in a preselected relation to the distance to the object measured by the distance sensor and the curvature of the road determined, determines a target speed based on the probability determined, and modifies the speed of the system vehicle to the target speed determined.

30 Claims, 13 Drawing Sheets

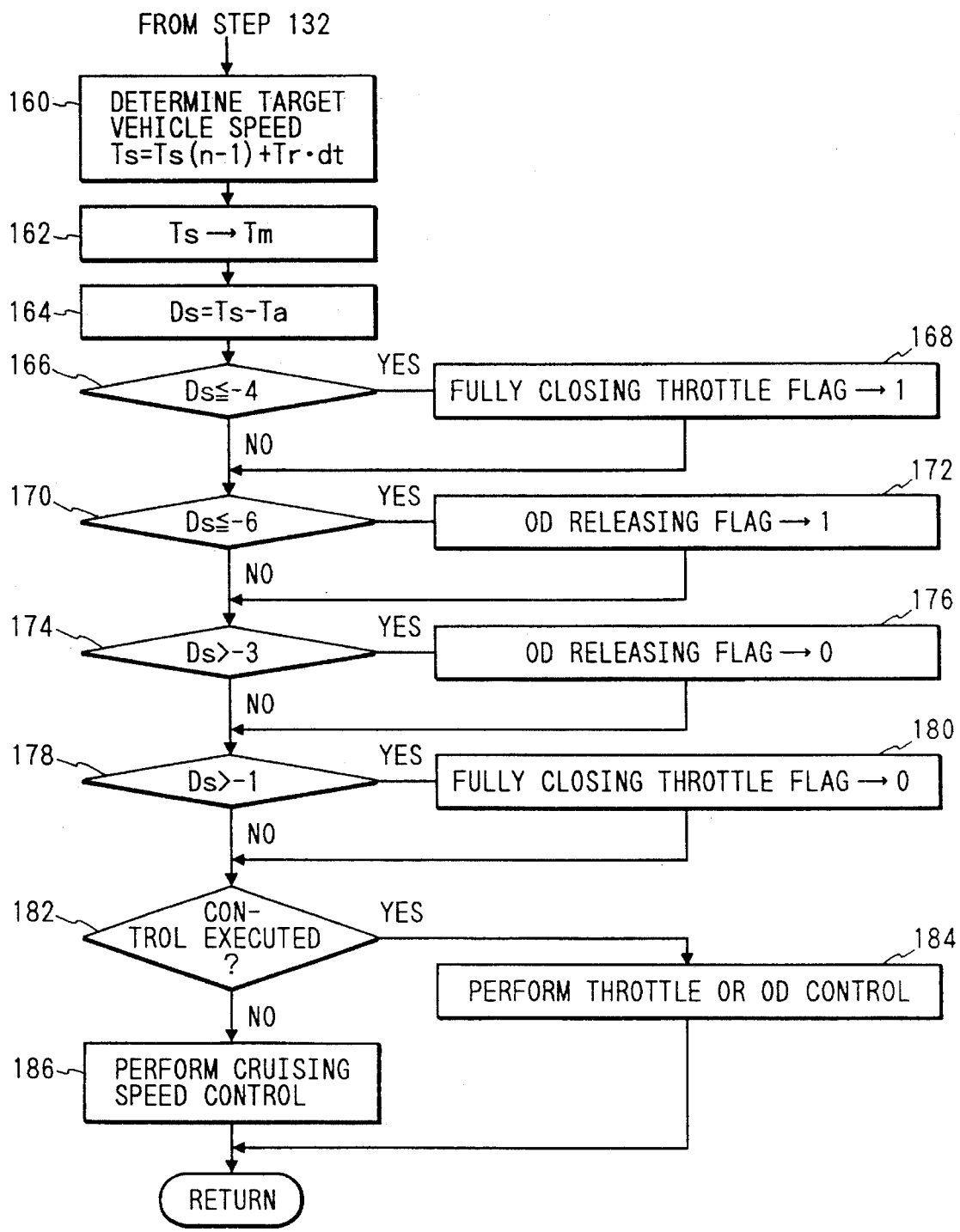

FIG. 7

RADIUS OF CURVATURE R (m)

PRECEDING VEHICLE PROBABILITY

| R → | 320 | 640 | 960 | 1280 | 1600 | 1920 | 2240 | 2560 |
|---|---|---|---|---|---|---|---|---|
| L= 8: | 98 | 98 | 98 | 98 | 98 | 98 | 98 | 98 |
| L=16: | 87 | 89 | 89 | 89 | 89 | 89 | 89 | 89 |
| L=24: | 72 | 79 | 80 | 81 | 81 | 81 | 81 | 81 |
| L=32: | 54 | 68 | 71 | 72 | 73 | 73 | 73 | 74 |
| L=40: | 36 | 58 | 63 | 64 | 65 | 66 | 66 | 67 |
| L=48: | 14 | 47 | 55 | 59 | 60 | 61 | 62 | 64 |
| L=56: | 0 | 31 | 48 | 56 | 60 | 62 | 64 | 69 |
| L=64: | 0 | 15 | 38 | 51 | 58 | 63 | 66 | 75 |
| L=72: | 0 | 5 | 27 | 45 | 55 | 62 | 66 | 78 |
| L=80: | 0 | 0 | 12 | 30 | 43 | 52 | 59 | 80 |
| L=88: | 0 | 0 | 0 | 12 | 27 | 41 | 53 | 93 |
| L=96: | 0 | 0 | 0 | 0 | 8 | 26 | 39 | 100 |

DETECTED DISTANCE L

FIG. 8
| Vn (km/h) \ Ds (m) | -32 | -16 | 0 | 16 | 32 | 48 | 64 |
|---|---|---|---|---|---|---|---|
| -24 | -10 | -10 | -10 | -10 | -10 | -3 | -1.5 |
| -16 | -10 | -10 | -10 | -5 | -5 | -3 | -0.5 |
| -8 | -10 | -5 | -3 | -1.5 | 0 | 0 | 0.5 |
| 0 | -10 | -2.5 | 0 | 1.0 | 1.5 | 2.0 | 2.5 |
| 8 | -2.0 | 2.0 | 3.0 | 4.0 | 3.0 | 3.0 | 3.0 |
| 16 | 0 | 2.0 | 2.0 | 2.5 | 3.0 | 3.0 | 3.0 |
BASIC CHANGE RATE OF SPEED (km/h/sec.)
CLOSER / CONSTANT / AWAY
 ACCELERATION
 DECELERATION

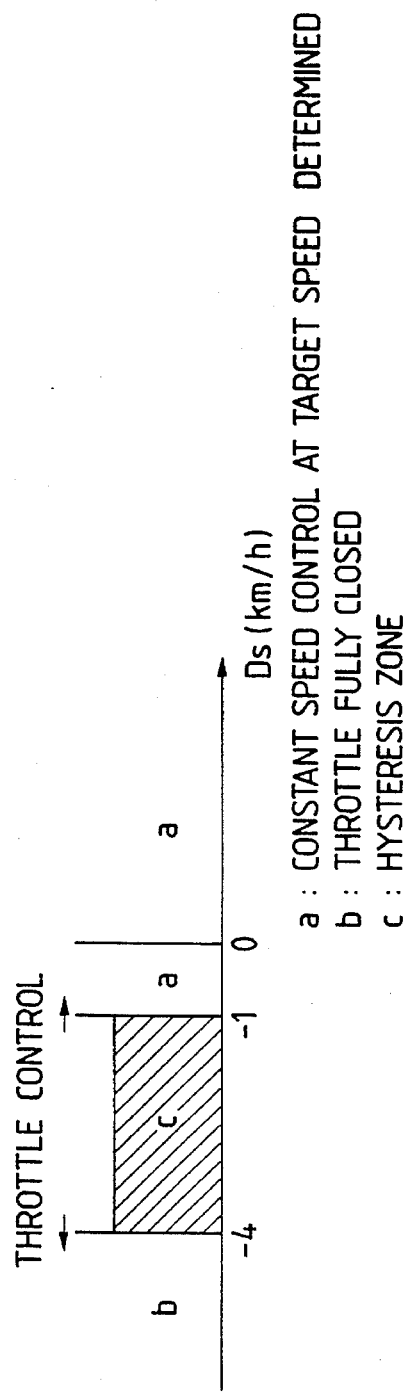
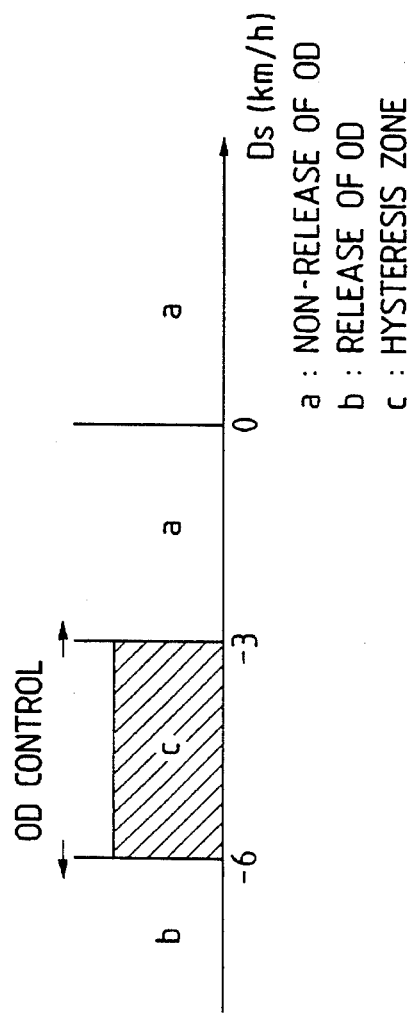
FIG. 12(a)
a : CONSTANT SPEED CONTROL AT TARGET SPEED DETERMINED
b : THROTTLE FULLY CLOSED
c : HYSTERESIS ZONE
FIG. 12(b)
a : NON-RELEASE OF OD
b : RELEASE OF OD
c : HYSTERESIS ZONE

SYSTEM FOR DISTINGUISHING A VEHICLE TRAVELING AHEAD BASED ON AN ADJUSTABLE PROBABILITY DISTRIBUTION

BACKGROUND OF THE INVENTION

1. Technical Field of the Invention

The present invention is relates generally to a system for detecting a preceding vehicle which may be employed in such as an automotive anticollision system. More particularly, the invention relates to an automotive radar system which is operable to minimize errors in detection of a preceding vehicle traveling ahead due to another vehicle moving on a different traffic lane or objects such as billboards, road signs, or lamp-posts arranged along a road.

2. Background Art

An automotive anticollision system is well known in the art which detects distance between a controlled vehicle and a preceding vehicle, and modifies the distance to the preceding vehicle to a target value of interest to a driver.

Such an anticollision system includes a radar unit for exact measurement of distance to a preceding vehicle. The radar unit of this type normally uses electromagnetic waves with high directivity such as radio waves or laser beams so that the distance to an object present in front of the controlled vehicle is measured with high accuracy. However, a drawback is encountered in that when the controlled vehicle is moving on a curved road, a vehicle traveling on a different traffic lane as well as billboards or reflectors arranged along the road may be tracked undesirably. This results in anticollision control not being carried out properly, reducing riding comfort and driving stability.

For avoiding the above drawback, Japanese Patent First Publication No. 60-169333 discloses a vehicle speed control system which holds vehicle speed at a fixed rate when a controlled vehicle is traveling on a curved road and releases the vehicle speed holding control when the intervehicle distance detected is less than an allowable minimum distance determined based on a vehicle speed or a steered angle.

In addition, Japanese Patent Second Publication No. 3-78596 teaches a preceding vehicle detecting system wherein electromagnetic waves are radiated forward in different directions, when a preceding vehicle tracked in the first direction moves out of a detectable range over a preselected distance ahead of a controlled vehicle, another vehicle present in the second direction is considered a preceding vehicle the system should track.

However, the above prior art systems have suffered from the following disadvantages.

In the former system, when a distant vehicle moving on a different traffic lane, billboards, or reflectors along a road is tracked while the controlled vehicle is cornering with a smaller steered angle or when the speed of the control vehicle is held at the fixed rate when the controlled vehicle is cornering with a greater steered angle, the reliability of detection of a preceding vehicle present on the same traffic lane as the controlled vehicle becomes low.

Additionally, in the later prior art system, while a preceding vehicle is being tracked with electromagnetic waves radiated in a direction, when another preceding vehicle is sensed by electromagnetic waves radiated in a different direction, the system does not consider it a preceding vehicle. Therefore, when a vehicle appears suddenly in front of the controlled vehicle from a different traffic lane, the system cannot respond quickly. Further, even when a radar-tracked preceding vehicle moves to a different traffic lane while traveling straight, the system may remain tracking the vehicle traveling on the different traffic lane.

SUMMARY OF THE INVENTION

It is therefore a principal object of the present invention to avoid the disadvantages of the prior art.

It is another object of the present invention to provide an automotive radar system which is operable to minimize errors in detection of a preceding vehicle traveling ahead due to another vehicle moving on a different traffic line or objects such as billboards, road signs, or lamp-posts arranged along a road.

According to one aspect of the present invention, there is provided a system for detecting a preceding vehicle present ahead of a system vehicle equipped with this system which comprises a distance determining means for deriving distance data representing a distance between the system vehicle and an object present ahead of the system vehicle within a preselected detection range, a curve determining means for determining curve data indicative of the degree of a curve in a road on which the system vehicle is traveling, a probability determining means for determining probability that the object present ahead of the system vehicle is identified as a vehicle based on the distance data determined by the distance determining means and the curve data determined by the curve determining means, and a change rate of speed determining means for determining a target change rate of speed of the system vehicle in a preselected relation to the probability determined by the probability determining means.

In the preferred mode, the preselected detection range of the distance determining means has a center line substantially coinciding with an extended longitudinal center line of the system vehicle and lies ahead of the system vehicle, the probability determining means providing a preselected probability distribution having a central zone indicating a higher probability extending across a center line corresponding to the center line of the detection range of the distance determining means and side zones indicating a lower probability lying adjacent the central zone, shifting the center line of the preselected probability distribution according to the curve data determined by the curve determining means, and determining the probability that the object present in the preselected detection range of the distance determining means is identified as the vehicle based on a ratio of the shifted probability distribution falling within lateral detection limits of the detection range of the distance determining means defined at a location of the distance to the object away from the system vehicle in a lateral direction perpendicular to the central line of the detection range.

According to another aspect of the present invention, there is provided a system for controlling the speed of a system vehicle equipped with this system to a desired speed according to an object present ahead of the system vehicle which comprises a distance determining means for determining a distance to an object present in a given forward detectable range, a curvature determining means for determining a curvature of a road on which the system vehicle is moving, a preceding vehicle probability determining means for determining probability that the object present in the given forward detectable range of the distance determining means is identified as a preceding vehicle traveling ahead of the system vehicle in a preselected relation to the distance to the object determined by the distance determining means and the curvature of the road determined by the curvature determining means, a target speed determining means for determining a target speed based on the probability determined by the preceding vehicle probability determining means, and a speed control means for controlling the speed of the system vehicle to the target speed determined by the target speed determining means.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings:

FIGS. 3 and 4 show a flowchart of a program performed by a control system of an automotive anticollision system incorporating a radar system of the invention.

FIG. 7 shows a map which provides the probability that an object detected may be identified as a preceding vehicle traveling on the same traffic lane as a controlled vehicle which is defined as a function of a radius of curvature of a road and the distance to the object detected.

FIG. 8 shows a map for determining a basic change rate of speed in a preselected relation to a difference between a target speed and an actual vehicle speed and a relative speed between a controlled vehicle and an object detected.

FIGS. 12(a) and 12(b) are illustration which show speed control modes according to a difference between a target speed and an actual vehicle speed.

DESCRIPTION OF THE PREFERRED EMBODIMENT

Figure 1:
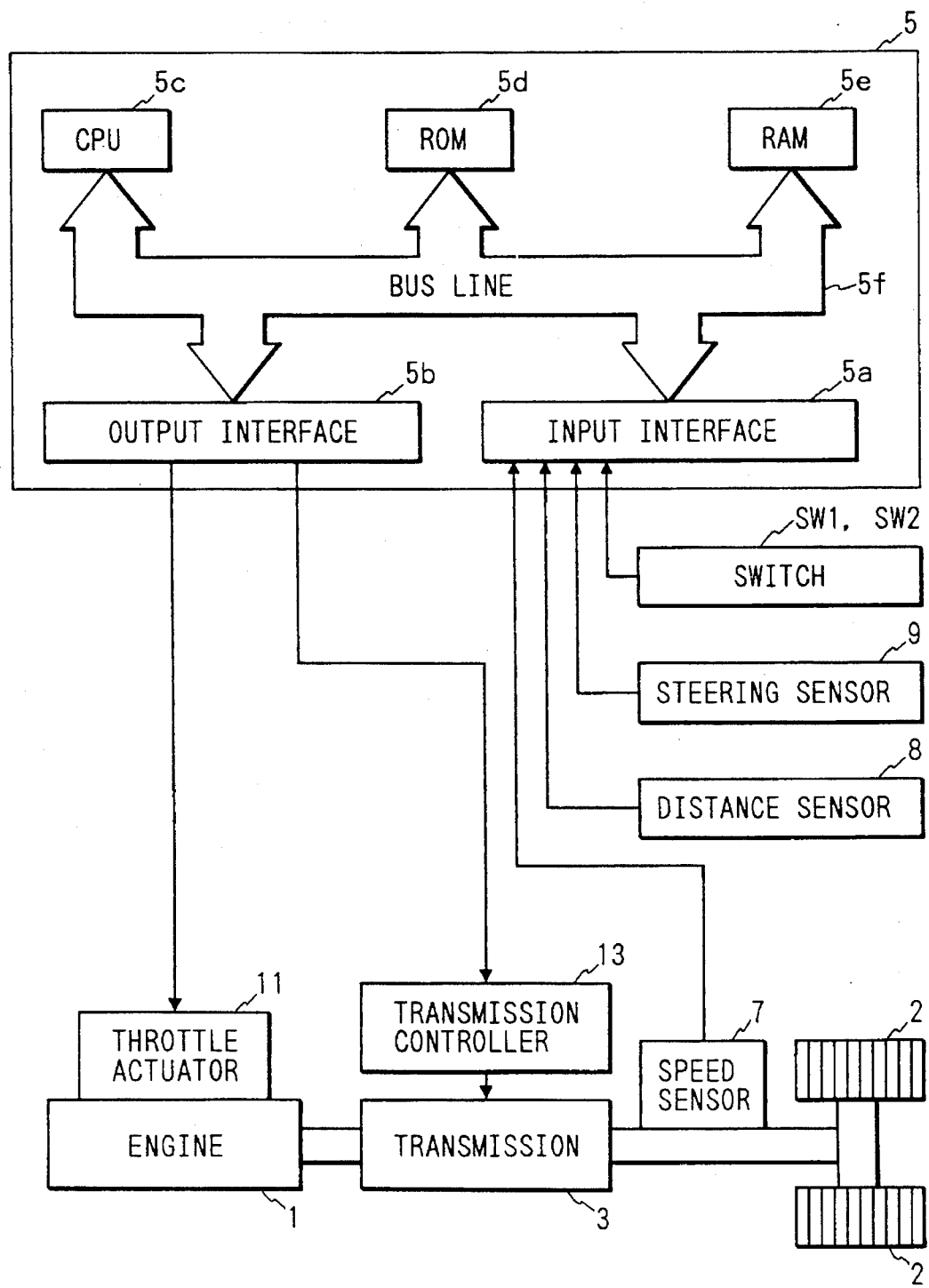
FIG. 1 is a block diagram which shows an automotive anticollision system equipped with a radar system according to the present invention.

Referring now to the drawings, wherein like numbers refer to like parts in several views, particularly to FIG. 1, there is shown an automotive anticollision system equipped with a radar system according to the present invention which is designed to automatically detect a preceding vehicle traveling on the same traffic lane. The radar system includes generally a control unit 5 provided with a computer, a vehicle speed sensor 7, an intervehicle distance sensor 8, a steering angle sensor 9, manual setting switches SW1 and SW2, a throttle actuator 11, and a transmission controller 13.

The control unit 5 includes an input interface 5a for receiving input information, an output interface 5b for outputting control information, a CPU 5c for performing arithmetic operations, a ROM 5d storing programs for control operations or maps for the arithmetic operations, a RAM 5e storing information based on the arithmetic operations, and a bus line 5f.

The vehicle speed sensor 7 is arranged to monitor rotation of an output shaft of a transmission 3 to determine rotating speed of wheels 2 and provides a signal indicative thereof to the input interface 5a of the control unit 5. The intervehicle distance sensor 8 is provided with an optical radar which radiates a laser beam in a forward direction to measure distance to an object or preceding vehicle and provides a signal indicative thereof to the input interface 5a. The intervehicle distance sensor may alternatively be provided with a radar unit which emits electromagnetic wave forward to determine an object present ahead of the system vehicle. The steering angle sensor is attached to a steering shaft of a steering wheel to detect a steered angle of the steering wheel and provides a signal indicative thereof to the input interface 5a. The manual setting switches SW1 and SW2 are provided with driver-operated selectors which select an initial set vehicle speed and a target intervehicle distance, respectively and provide signals indicative thereof to the input interface 5a.

The throttle actuator 11 is adapted to be responsive to a control signal from the output interface 5b to drive a throttle valve mechanism which controls the speed of an engine 1. The transmission controller 13 is also responsive to a control signal from the output interface 5b to select a desired gear ratio in the transmission 3.

Figure 2:
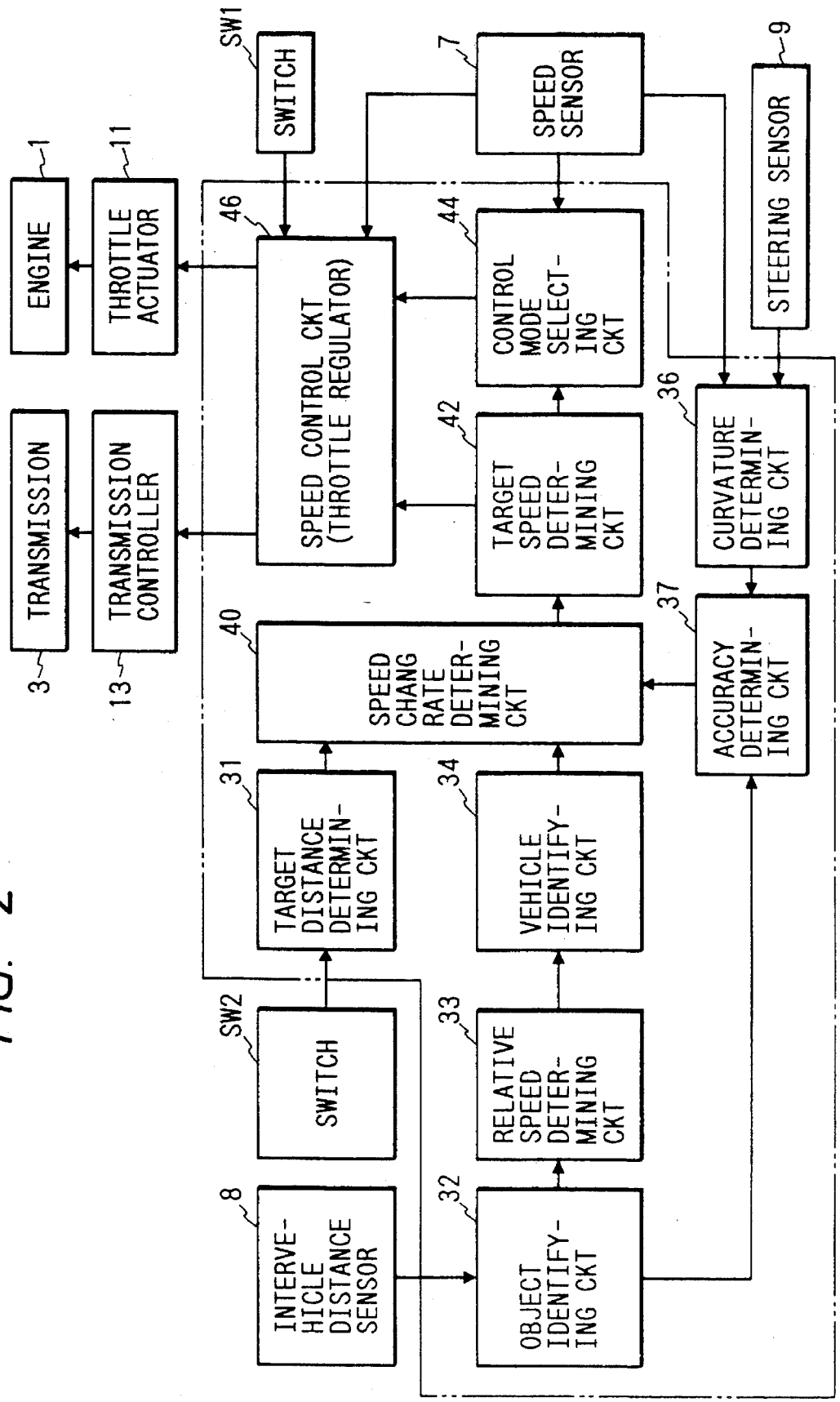
FIG. 2 is a circuit diagram which shows an essential part of an automotive anticollision system incorporating a radar system of the invention.

A control circuit of the anticollision system will be described in detail with reference to FIG. 2.

The manual setting switch SW2 is, as mentioned above, designed to set an intervehicle distance of interest to a vehicle operator, or driver and provides same to a target intervehicle distance determining section 31. The target intervehicle distance determining section 31 then determines a target intervehicle distance. It is desirable that the target intervehicle distance be changed automatically based on a vehicle speed so that it may be increased according to an increase in vehicle speed.

An object determining section 32 is adapted to determine a variation in data indicative of distance to an object detected by the intervehicle distance sensor 8 to check the reliability of the data required for identifying the detected object. For example, when the variation in data is larger than a preselected threshold value, it is concluded that an object, or target in front of the system vehicle cannot be identified precisely, and the data is neglected.

A relative speed determining section 33 is responsive to the proper data from the object determining section 32 to measure relative speed of the target based on the difference in distance to the object detected between control cycles of the control unit 5.

A vehicle identifying section 34 continuously monitors data representative of the relative speed derived by the relative speed determining section 33 to determine whether the target in front of the system vehicle is a preceding vehicle moving on the same traffic lane or not. This determination may alternatively be made in the intervehicle distance sensor 8.

A curvature determining section 36 mathematically determines the degree of a curve in a road or the radius of curvature R of the road on which the system vehicle is traveling based on a steered angle and a vehicle speed detected by the steering angle sensor 9 and the vehicle speed sensor 7.

A preceding vehicle accuracy determining section 37 is adapted to analyze the accuracy or probability that the target detected will be a preceding vehicle traveling on the same traffic lane as the system vehicle based on a detectable range of the intervehicle distance sensor 8 stored in the ROM 5d, as will be described hereinafter in detail, and the radius of curvature R derived by the curvature determining section 36. This probability will be hereinafter referred to as preceding vehicle probability.

A speed change rate determining section 40 determines a target change rate in speed (i.e., a target acceleration or deceleration) based on the target intervehicle distance set by the target intervehicle distance determining section 31, the distance to the target detected by the intervehicle distance sensor 8, the relative speed derived by the relative speed determining section 33, the detection results of the vehicle identifying section 34, and the preceding vehicle probability determined by the preceding vehicle probability determining section 37. In brief, the speed change rate determining section 40 initially classifies the detection status of the intervehicle distance sensor 8 into three: vehicle identifying condition, object identifying condition, and non-detection condition, as will be described in detail in connection with FIG. 3, and determines an individual change rate in speed for every condition.

A target vehicle speed determining section 42 integrates the target change rate in speed determined by the speed change rate determining section 40 to derive a target vehicle speed Ts.

A control mode selecting section 44 compares an actual vehicle speed monitored by the vehicle speed sensor 7 with the target vehicle speed Ts derived by the target vehicle speed determining section 42 to determine whether a vehicle speed control mode should be changed or not. In other words, it is determined if the transmission 3 needs to be controlled in order to adjust the actual vehicle speed to the target vehicle speed Ts.

A vehicle speed control section 46 controls the throttle actuator 11 to modify an opening degree of the throttle valve mechanism using the same logic as employed in the so-called constant speed control system so that the actual vehicle speed detected by the vehicle speed sensor 7 may be modified to the target vehicle speed Ts derived by the target vehicle speed determining section 42. Additionally, in the case where it becomes necessary to control the transmission 3, a control signal is provided to the transmission controller 13 to change a gear ratio of the transmission 3 for modifying the vehicle speed.

The manual setting switch SW1 has a plurality of setting positions to fix an initial vehicle speed in the vehicle speed control section 46, to switch between a normal constant speed control mode (also called automatic cruising control) and a intervehicle distance control mode, to prohibit the vehicle speed control, and to manually modify a rate of change in vehicle speed under the vehicle speed control. In place of manual operation of the setting switch SW1, the switching between the constant speed control mode and the intervehicle distance control mode may alternatively be made automatically, for example, when the vehicle speed or the intervehicle distance meets some condition.

Figure 3:
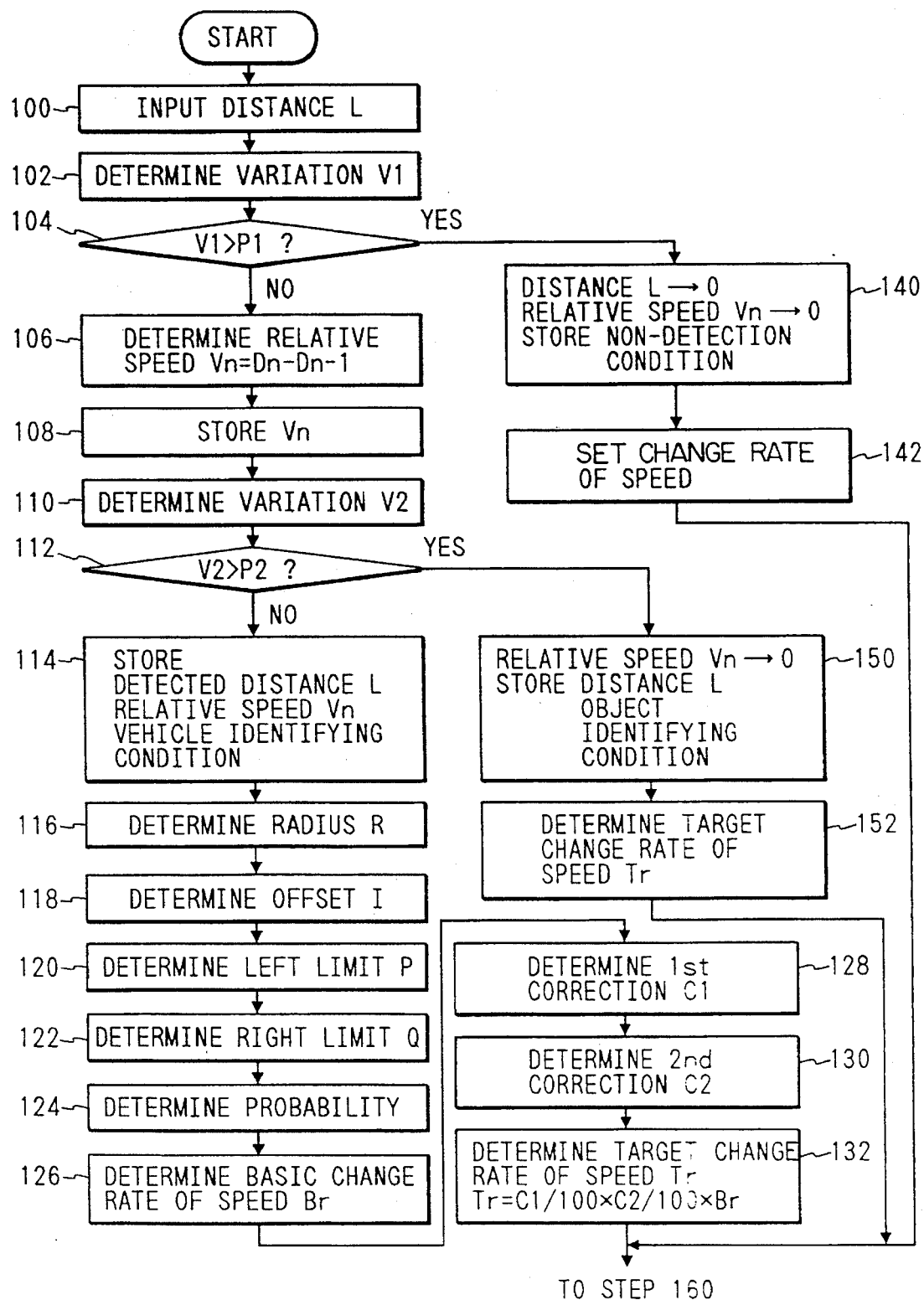

Referring to FIGS. 3 and 4, there is shown a flowchart of a program or sequence of logical steps performed by the object determining section 32, the vehicle identifying section 34, the speed change rate determining section 40, the target vehicle speed determining section 42, the control mode selecting section 44, and the preceding vehicle accuracy determining section 37.

After entering the program, the routine proceeds to step 100 wherein distance L to an object tracked by the intervehicle distance sensor 8 is input to the control unit 5.

The routine then proceeds to step 102 wherein a variation V1 in the distance to the object detected is determined.

The routine then proceeds to step 104 wherein it is determined whether the distance variation V1 derived in step 102 is greater than a preselected threshold value P1 or not. If a NO answer is obtained (V1<P1), concluding that there is some object ahead of the system vehicle (at this time, the speed change rate determining section 40 considers that the system is in the object identifying condition), the routine then proceeds to step 106. Alternatively, if a YES answer is obtained (V1>P1), concluding that there is no object ahead of the system vehicle (the speed change rate determining section 40 determines that the system is in the non-detection condition), the routine then proceeds to step 140, as will be described hereinafter.

In step 106, based on the difference in distance detected between the control cycles of the control unit 5, the relative speed between the system vehicle and the object detected is determined. For example, a distance to the object detected one control cycle earlier $D_{n-1}$ is subtracted from a distance to the object detected in a current control cycle $D_n$ to determine a relative vehicle speed $V_n$ as a function of variation in distance for a preselected time interval.

The routine then proceeds to step 108 wherein the relative vehicle speed $V_n$ derived in step 106 is stored in a buffer of the RAM 5e.

In step 110, a variation V2 in the relative vehicle speed 1s determined over the preselected number of control cycles.

The routine then proceeds to step 112 wherein it is determined whether the relative vehicle speed variation V2 derived in step 110 is greater than a set value P2 or not. If a NO answer is obtained (V2<P2), concluding that the object detected is identified as a moving vehicle attention should be directed to (the speed change rate determining section 40 determines that the system is in the vehicle identifying condition), the routine then proceeds to step 114. Alternatively, if a YES answer is obtained (V2>P2), concluding that the object detected is identified as some object other than a vehicle (i.e., the system is in the object identifying condition), the routine then proceeds to step 150.

In step 114, the detected distance L to the vehicle present ahead, the relative vehicle speed $V_n$, and data showing that the system is in the vehicle identifying condition are stored in the RAM 5e.

In step 116, the degree of a curve in a road (i.e., the radius of curvature of the road) on which the system vehicle is traveling, is mathematically determined based on the steered angle of the system vehicle determined by the steering sensor 9 and the vehicle speed according to a given equation of vehicular motion.

Figure 6:
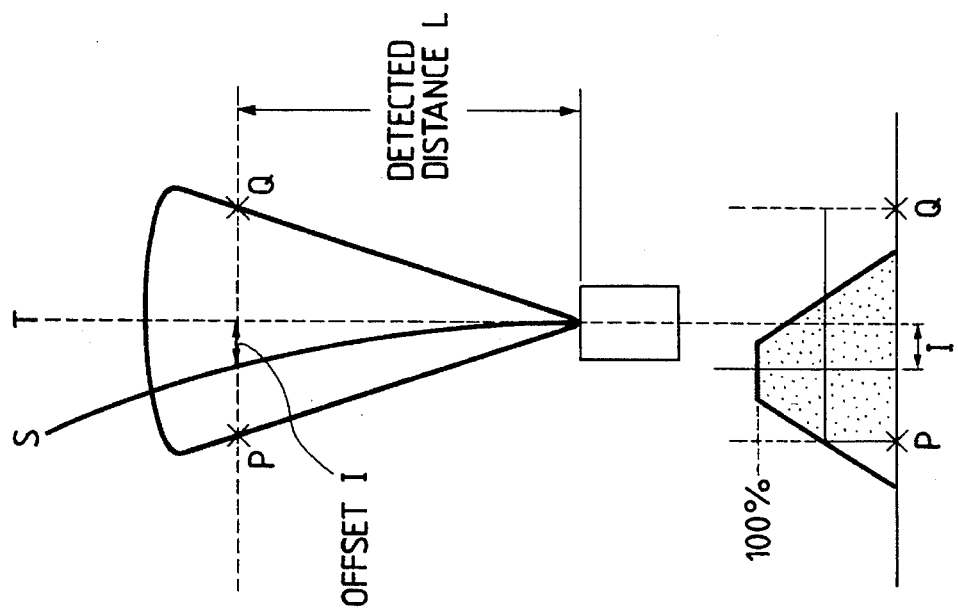
FIG. 6 is an illustration which shows a location of distribution of probability that an object detected may be identified as a preceding vehicle traveling on the same traffic lane as a controlled vehicle when traveling a curved road.

In step 118, an offset, or interval I, as shown in FIG. 6, between a curved line S (i.e., the center line of the curved road having the radius of curvature R) and an extended longitudinal center line T of the system vehicle (i.e., a center line of a detectable range of the intervehicle distance sensor 8, which may also be assumed to be the center of a lane on which the system vehicle is traveling) on a line extending perpendicular to the longitudinal center line T at a location where the detected vehicle exists (i.e., at a location of the detected distance L ahead of the system vehicle) is mathematically calculated.

In steps 120 and 122, left and right limits P and Q of the detectable range of the intervehicle distance sensor 8 on the line extending perpendicular to the longitudinal center line T at a location of the detected distance L ahead of the system vehicle, are determined, respectively. These limits P and Q may be derived by look-up using mapped data, stored in the ROM 5e, representing the relation of detection limits to a detected distance of the intervehicle distance sensor 8.

Figure 5:
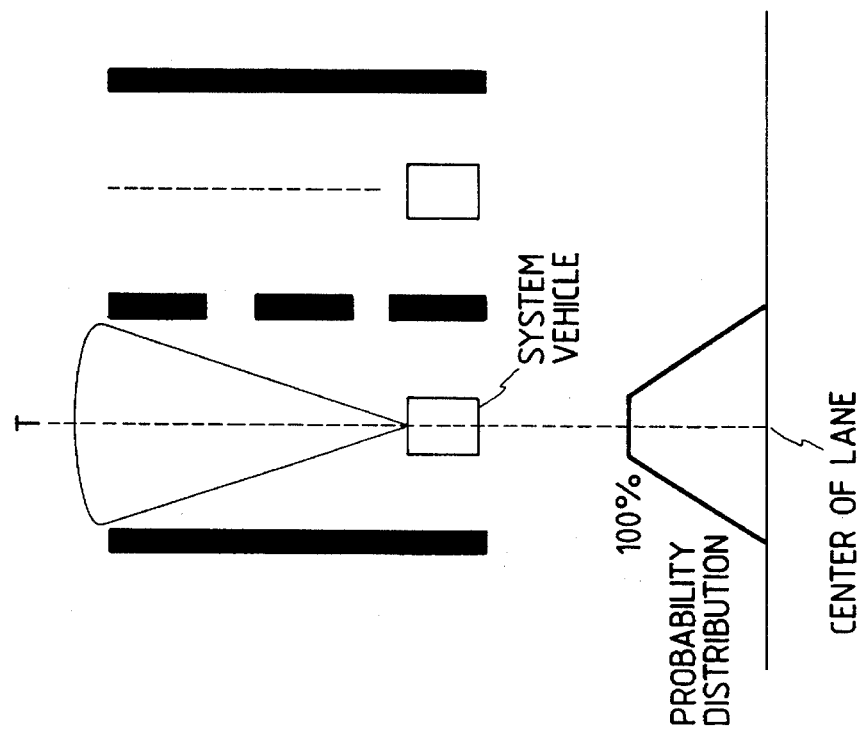
FIG. 5 is an illustration which shows the distribution of probability that an object detected may be identified as a preceding vehicle traveling on the same traffic lane as a controlled vehicle.
Figure 9A:
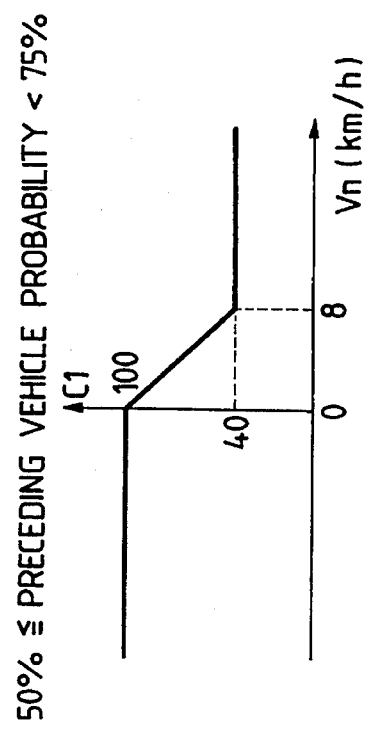
FIGS. 9(a), 9(b), 9(c), and 9(d) show maps for determining a first correction value for a change rate of speed based on probability that an object detected may be identified as a preceding vehicle traveling on the same traffic lane as a controlled vehicle and a relative speed between the object and the controlled vehicle.
Figure 9B:
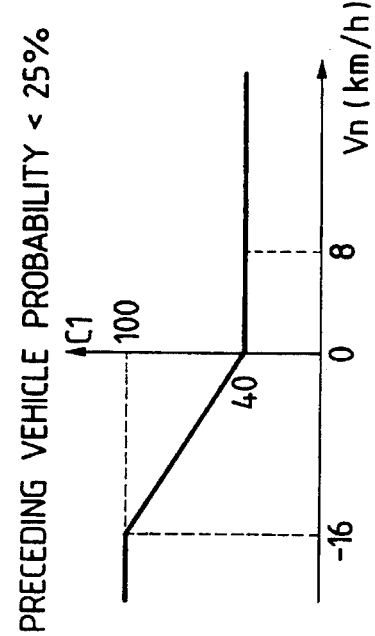
Figure 9C:
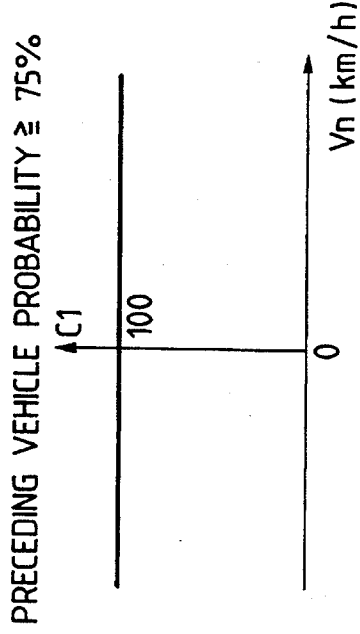
Figure 9D:
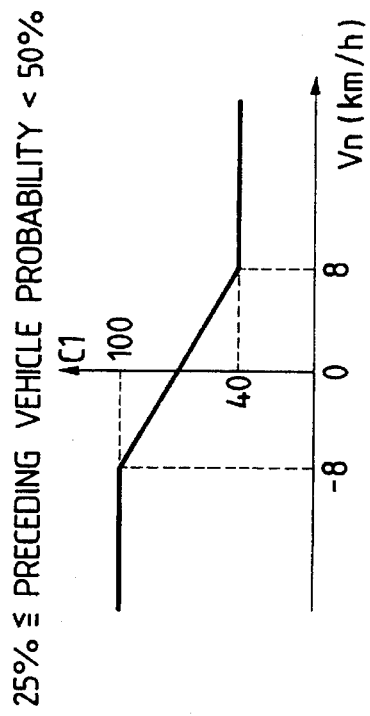

In step 124, a preceding vehicle probability distribution, as shown in FIG. 5, is initially provided in a preselected relation to the detected distance L and the radius of curvature R of the road. The preceding vehicle probability distribution includes a central zone indicating a probability of 100% extending across the center line corresponding to the center line (i.e., the longitudinal center line T of the system vehicle) of a forward detectable range of the intervehicle distance sensor 8 and side zones indicating a lower probability decreasing in a width direction of the detectable range of the intervehicle distance sensor 8 (i.e., in a lateral direction of the road) toward both sides of a road. Subsequently, the center line of the preceding vehicle probability distribution thus provided is, as shown in FIG. 6, shifted inwardly of the curved road in the lateral direction of the system vehicle by the interval I derived in step 118, and random variables within the detectable range of the intervehicle distance sensor 8 (i.e., within a range between the limits P and Q) are averaged to determine the preceding vehicle probability that the vehicle detected may be a preceding vehicle which is traveling in front of the system vehicle on the same traffic lane. In other words, the preceding vehicle probability is determined based a ratio of the shifted probability distribution falling within the limits P and Q of the detectable range at a location of the distance L away from the system vehicle in a lateral direction perpendicular to the center line of the detectable range. The preceding vehicle probability may be derived by look-up using a two-dimensional map or table, as shown in FIG. 7, on which data are plotted in a given relation between the detected distance L and the radius of curvature R of the road.

The operation of the speed change rate determining section 40 will be discussed below.

The speed change rate determining section 40 is operable to determine acceleration or deceleration of the system vehicle based on the object identifying condition, the non-detection condition, and the vehicle identifying condition.

In step 126, since the system is now in the vehicle identifying condition, a basic change rate of speed Br is determined by look-up using a two-dimensional speed change rate map, as shown in FIG. 8. The speed change rate map shows data of a change rate of speed defined in a relation between the difference Ds between an actual intervehicle distance and the target intervehicle distance (i.e., a parameter indicative of whether the preceding vehicle is present far ahead of or near the system vehicle) and the relative speed $V_n$ between the system vehicle and the preceding vehicle (i.e., a parameter indicative of whether the system vehicle is approaching the preceding vehicle or moving away therefrom). In the map, a negative value represents deceleration, while a positive value represents acceleration. Intermediate values, or values between two shown values may be determined using the interpolation. In addition, when the difference Ds and the relative speed $V_n$ is out of the range in the map, a maximum or minimum value in the map may be used.

The use of the change rate of speed in the map, as shown in FIG. 8, prevents the system vehicle from decelerating undesirably when the preceding vehicle is moving away from the system vehicle but with a smaller intervehicle distance, and also conducts fine control wherein deceleration is made early when the system vehicle is approaching the preceding vehicle at a higher relative speed if an intervehicle distance is great.

In step 128, a first correction coefficient $C_1$ for the change rate of speed is determined. In detail, one of maps, as shown in FIGS. 9(*a*), 9(*b*), 9(*c*), and 9(*d*), is selected according to the degree of the preceding vehicle probability, and the first correction coefficient $C_1$ is derived based on the relative speed $V_n$ between the system vehicle and the preceding vehicle. When the preceding vehicle probability is more than 75%, the map, as shown in FIG. 9(*a*), is used, and the first correction coefficient $C_1$ of 100% is provided regardless of the relative speed. When the preceding vehicle probability is greater than 50% and smaller than 75%, the map, as shown in FIG. 9(*b*) is used, and the first correction coefficient $C_1$ of 100% is provided when the relative speed is a negative value, that is, when the preceding vehicle is approaching the system vehicle, the first correction coefficient $C_1$ of 40% is provided when the relative speed is greater than 8 km/h, and between 0 and 8 km/h of the relative speed, the first correction coefficient $C_1$ is gradually decreased. When the preceding vehicle probability is greater than 25% and smaller than 50%, the map, as shown in FIG. 9(*c*), is used, and the first correction coefficient $C_1$ of 100% is provided when the relative speed is smaller than −8 km/h, the first correction coefficient $C_1$ of 40% is provided when the relative speed is greater than 8 km/h, and between −8 and 8 km/h of the relative speed, the first correction coefficient $C_1$ is gradually decreased. When the preceding vehicle probability is smaller than 25%, the map, as shown in FIG. 9(*d*), is used, and the first correction coefficient $C_1$ of 100% is provided when the relative speed is smaller than −16 km/h, the first correction coefficient $C_1$ of 40% is provided when the relative speed is greater than 0 km/h, and between −16 and 0 km/h of the relative speed, the first correction coefficient $C_1$ is gradually decreased.

The correction using the first correction coefficient $C_1$ is such that as the preceding vehicle probability becomes small, the reliability of tracking a preceding vehicle of the radar system is considered to be low for minimizing tracking errors. Therefore, with this correction, even when the preceding vehicle probability is very small (less than 25%), the first correction coefficient of 100% is provided for safety purposes as long as the preceding vehicle is approaching quickly. Additionally, as the preceding vehicle probability is getting smaller, the system vehicle is prevented from accelerating quickly when the preceding vehicle is moving away. Alternatively, even when the system vehicle is approaching the preceding vehicle, it is prevented from decelerating quickly.

Figure 10:
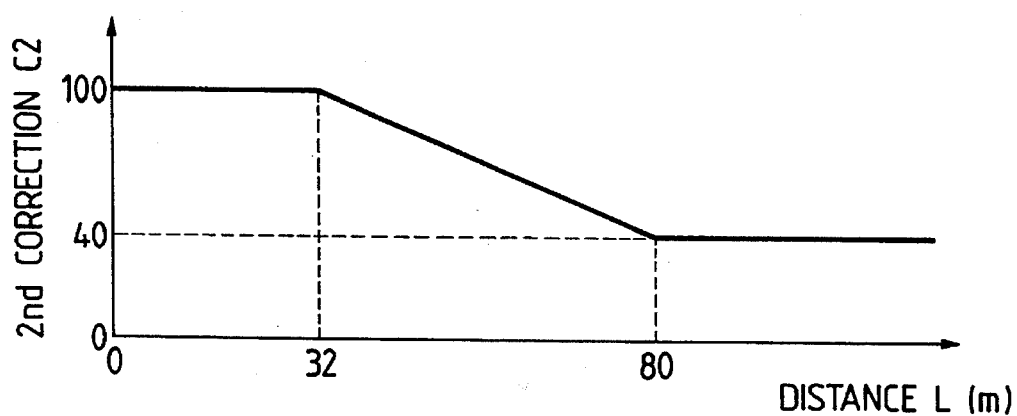
FIG. 10 shows a map for determining a second correction value for a change rate of speed variable according to an increase in distance to an object detected.

Subsequently, in step 130, a second correction coefficient $C_2$ for the change rate of speed is determined based on the intervehicle distance by look-up using a map, as shown in FIG. 10. The map shows that the second correction coefficient $C_2$ of 100% is provided when the intervehicle distance is smaller than 32 m, the second correction coefficient $C_2$ of 40% is provided when the intervehicle distance is greater than 80 m, and it is gradually decreased within a range from 32 m to 80 m of the intervehicle distance. The correction using the second correction coefficient $C_2$ is such that since when the intervehicle distance is great, fine intervehicle distance control is not required, the change rate of speed is reduced so that the intervehicle distance is modified slowly in favor of riding comfort.

In step 132, according to the following equation (1), the basic speed change rate Br derived in step 126 is multiplied by the first correction coefficient $C_1$ derived in step 128 and the second correction coefficient $C_2$ derived in step 130 to determine a target change rate of speed Tr, after which the routine proceeds to step 160.

$$Tr = (C_1/100) \times (C_2/100) \times Br \qquad (1)$$

If a YES answer is obtained in step 104 concluding that the distance variation V1 is greater than the preselected threshold value P1 and there is no object present ahead which can possibly collide with the system vehicle within the detectable range of the intervehicle distance sensor 8, the routine then proceeds to step 140 wherein the intervehicle distance and the relative speed are set to zero and data indicating that the system vehicle is in the non-detection condition is stored in the RAM 5e.

In step 142, a preselected change rate of speed is provided, and the routine then proceeds to step 160. This preselected change rate of speed is set to a relatively small acceleration so that the system vehicle may accelerate slowly to a target speed selected by the driver through the setting switch SW1 under the constant speed control. The change rate of speed may alternatively be modified according to driving information from the steering sensor 9 and/or turn indicators (not shown).

If a YES answer is obtained in step 112 concluding that the relative vehicle speed variation V2 is greater than the set value P2 and there is some object other than a vehicle in front of the system vehicle, the routine then proceeds to step 150 wherein a distance to the object detected by the intervehicle distance sensor 8 is stored in the RAM 5e, the relative speed $V_n$ is set to zero, and data representing that the system vehicle is in the object identifying condition is stored in the RAM 5e.

Figure 11:
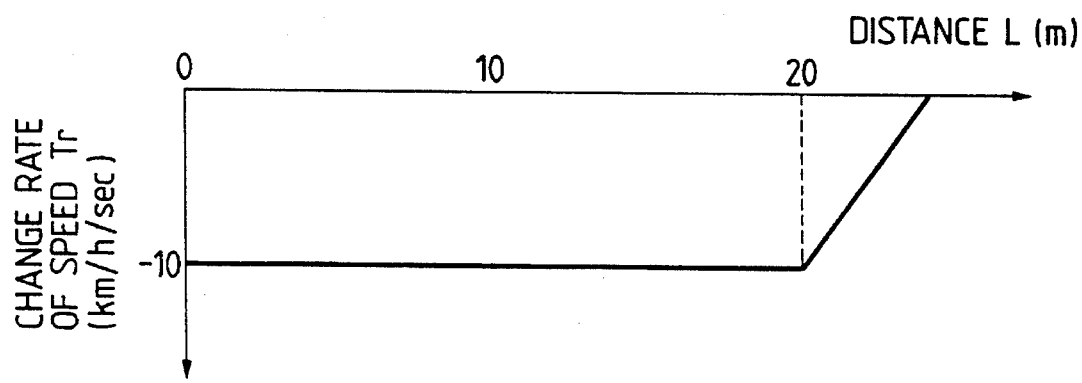
FIG. 11 shows a map for determining a change rate of speed when the system is in an object identifying condition.

In step 152, according to the map, as shown in FIG. 11, a target change rate of speed Tr is determined based on the distance to the object detected, and then the routine proceeds to step 160. The map in FIG. 12 shows that the speed of the system vehicle is reduced at a constant rate when the distance detected is less than twenty meters (20 m) and the reduction in speed is decreased gradually when the distance detected is greater than 20 m. This speed control is provided for assuring safety in case of emergency where a vehicle appears suddenly between the system vehicle and the detected object from another traffic lane since although the detected object is not identified as a vehicle, the operations of the relative speed determining section 33 and the vehicle identifying section 34 are time-consuming.

As discussed above, in steps 126 to 132, the change rate of speed is determined when the detected object is identified as a vehicle. In step 152, the change rate of speed is determined when the detected object is identified as an obstacle other than a vehicle. In step 142, the change rate of speed is determined when no object is detected.

In step 160, the target change rate of speed Tr derived in either one of steps 132, 142, and 152 is integrated to determine a correction speed (Tr·dt) and it is added to the target vehicle speed $Ts(_{n-1})$ derived in one control cycle earlier to determine the target vehicle speed Ts according to the following formula.

$$Ts = Ts(_{n-1}) + Tr \cdot dt \qquad (2)$$

In step 162, when the target vehicle speed Ts determined in step 160 exceeds a given speed limit Tm, it is corrected to below the given speed limit Tm to decrease the difference from an actual vehicle speed for preventing the system vehicle from accelerating or decelerating suddenly. For example, it is preferable that the target vehicle speed Ts be restricted less than the set vehicle speed selected by the setting switch SW1.

The operation of the control mode selecting section 44 will be described below which is based on maps, as shown in FIG. 12(a) and 12(b).

In step 164, the difference Ds between the target vehicle speed Ts and an actual speed Ta detected by the vehicle speed sensor 7 is determined as a criterion in the maps, as shown in FIG. 12(a) and 12(b).

In step 166, it is determined whether the difference Ds between the target vehicle speed and the actual vehicle speed is smaller than −4 km/h or not. If a YES answer is obtained concluding that the target vehicle speed is slower than the actual vehicle speed by more than 4 km/h, the routine then proceeds to step 168 wherein a fully closing throttle flag is set to one for activating the throttle actuator 11 to close the throttle valve completely for decelerating the system vehicle quickly, as shown in FIG. 12(a).

After step 168 or if a NO answer is obtained in step 166, the routine then proceeds to step 170 wherein it is determined whether the difference Ds between the target vehicle speed and the actual vehicle speed is less than −6 km/h or not. If a YES answer, the routine then proceeds to step 172 wherein an OD releasing flag is set to one for releasing the overdrive of the transmission 3 to change gear to a higher ratio, as shown in FIG. 12(b).

After step 172 or if a NO answer is obtained in step 170, the routine then proceeds to step 174 wherein it is determined whether the difference Ds between the target vehicle speed and the actual vehicle speed is greater than −3 km/h or not. If a YES answer is obtained, the routine then proceeds to step 176 wherein the OD releasing flag is set to zero for establishing the overdrive, as shown in FIG. 12(b).

After step 176 or if a NO answer is obtained in step 174, the routine then proceeds to step 178 wherein it is determined whether the difference Ds between the target vehicle speed and the actual vehicle speed is greater than −1 km/h or not. If a YES answer is obtained, the routine then proceeds to step 180 wherein the fully closing throttle flag is set to zero for activating the throttle actuator 11 to open the throttle valve under the constant speed control, as shown in FIG. 12(a). In FIGS. 12(a) and 12(b), hysteresis zones, as shown by hatched lines, are provided for the sake of eliminating an uncomfortable feeling caused by a discontinuous change in speed control.

The operation of the control mode selecting section 44 makes it possible to detect a condition where the actual vehicle speed is not decreased even though the target vehicle speed is decreased (e.g., when the system vehicle is traveling on a downhill road), the transmission 3 being controlled to select a higher gear ratio for providing great reduction in speed.

After step 180 or if a NO answer is obtained in step 178, the routine then proceeds to step 182 wherein it is determined whether the control according to the flag derived in steps 168 to 180 should be carried out or not. If a YES answer is obtained, the routine goes to step 184 wherein the throttle valve control and/or the transmission control is performed so that the actual vehicle speed may agree with the target vehicle speed, after which the routine is returned back to step 100. Alternatively, if a NO answer is obtained in step 182, the routine then proceeds to step 186 wherein the system vehicle falls under the constant speed control to adjust the vehicle speed to the target vehicle speed.

As discussed above, the system of this embodiment is such that based on the variation in distance detected by the intervehicle distance sensor 8, the speed control mode is selected. When the distance data provided by the intervehicle distance sensor shows higher accuracy that an object present ahead of the system vehicle can be identified as a preceding vehicle traveling on the same traffic lane, the reliability of preceding vehicle-tracking operation of the radar system is considered a higher level and the intervehicle distance is controlled properly. Alternatively, when the accuracy is lower, the reliability of preceding vehicle-tracking operation is considered a lower level, and the system is prevented from responding to any object other than a vehicle such as billboards and/or reflectors along a road and/or vehicles traveling on a different traffic lane. Additionally, when it is difficult to determine whether an object present ahead is a preceding vehicle or not, the response rate of the system is increased when the object is approaching the system vehicle, while it is decreased when the object is moving away form the system vehicle.

Figure 13:
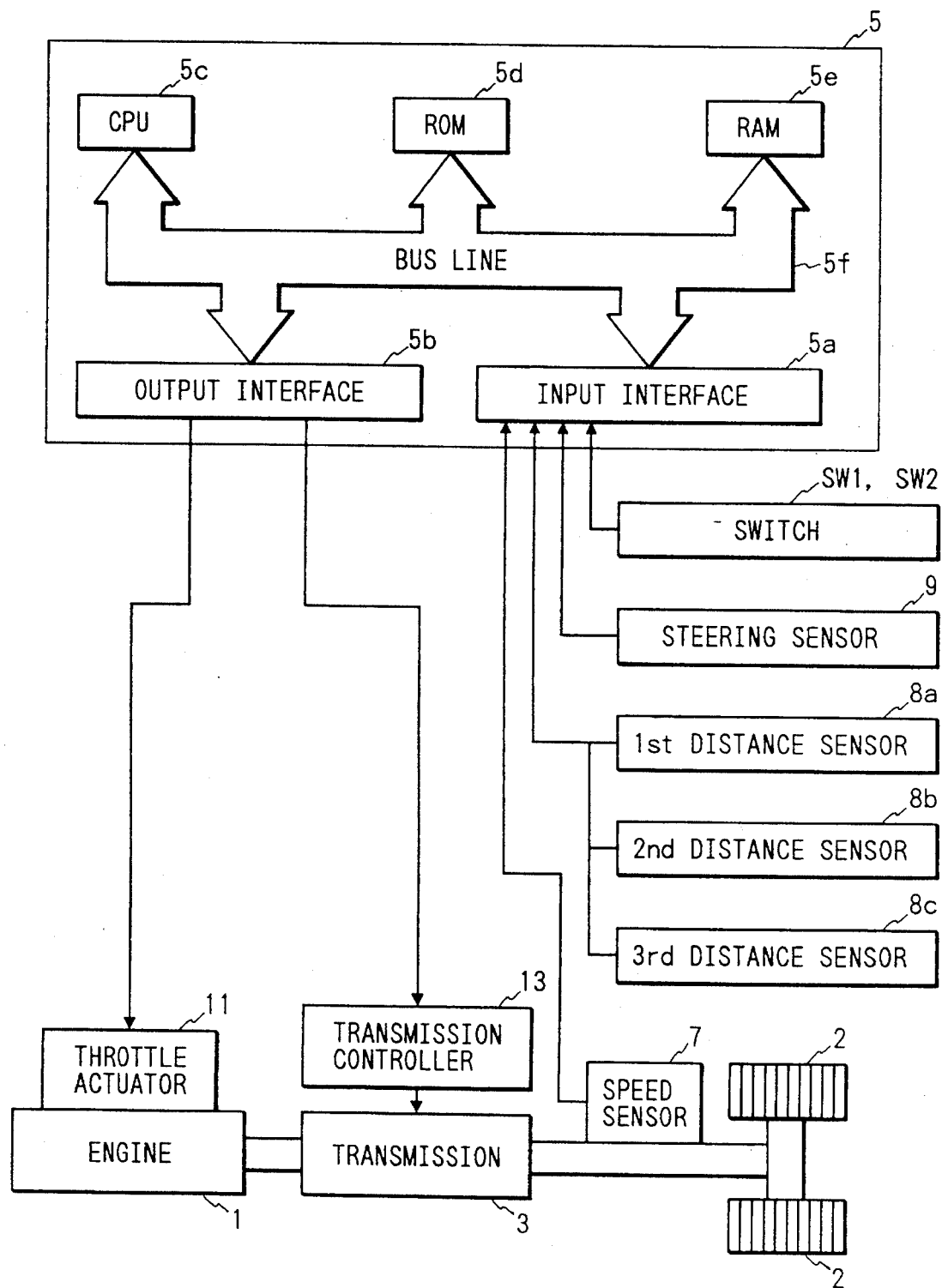
FIG. 13 is a block diagram which shows an alternative embodiment of an automotive anticollision system equipped with a radar system according to the present invention.

Referring to FIG. 13, there is shown an alternative embodiment according to the present invention. The system of this embodiment includes a plurality of intervehicle distance sensors and is operable to know which of the sensors shows the highest accuracy of distance data for use in the intervehicle distance control.

The system of this embodiment includes first, second, and third intervehicle distance sensors 8a, 8b, and 8c. The first intervehicle distance sensor 8a is adapted to have a forward detectable rage within which distance to an object present in front of the system vehicle may be measured. The second and third intervehicle distance sensors 8b and 8c have leftward and rightward detectable ranges within which distances to objects existing in leftward or rightward directions may be measured. Other arrangements are substantially the same as in the first embodiment and explanation thereof in detail will be omitted here.

Figure 14:
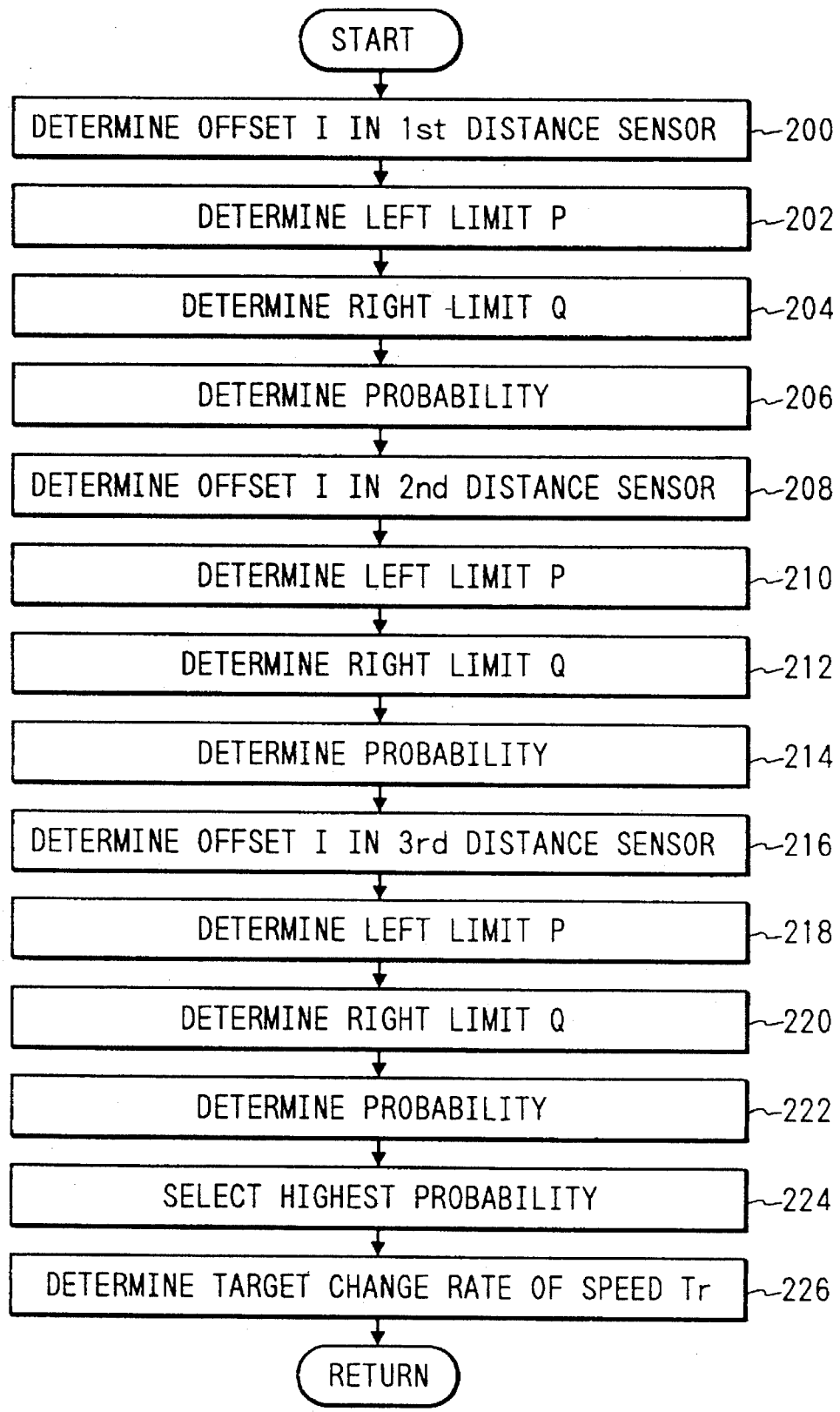
FIG. 14 shows a flowchart of a program performed by a control system of an automotive anticollision system of a second embodiment.

Referring to FIG. 14, a flowchart of an tracking operation in the radar system is shown.

After initiation of a program, the routine then proceeds to step 200 wherein a preceding vehicle probability distribution in the forward detectable range of the first intervehicle distance sensor 8a is initially provided which represents, as shown in FIG. 5, a probability of 100% over a given central range and it is decreased at a preselected rate in a lateral direction of a road (i.e., the system vehicle), and an offset, or interval I, as shown in FIG. 6, between the curved line S and the extended longitudinal center line T of the system vehicle (i.e., the center line of a center laser beam radiated from the first intervehicle distance sensor 8a) at a location where the detected object exists, is determined.

Subsequently, in steps 202 and 204, left and right limits P and Q of the detectable rage of the intervehicle distance sensor 8a are determined, respectively in the same manner as in the first embodiment.

In step 206, the center of the preceding vehicle probability distribution thus provided is shifted in a lateral direction of the system vehicle by the interval I, and random variables within the detectable range of the intervehicle distance sensor 8a (i.e., within a range between the limits P and Q) are averaged to determine a first preceding vehicle probability in the intervehicle distance sensor 8a. The preceding vehicle probability may be derived by look-up using a two-dimensional map or table, as shown in FIG. 7, on which data are plotted in a given relation between the detected distance L and the radius of curvature R of the road.

Figure 15:
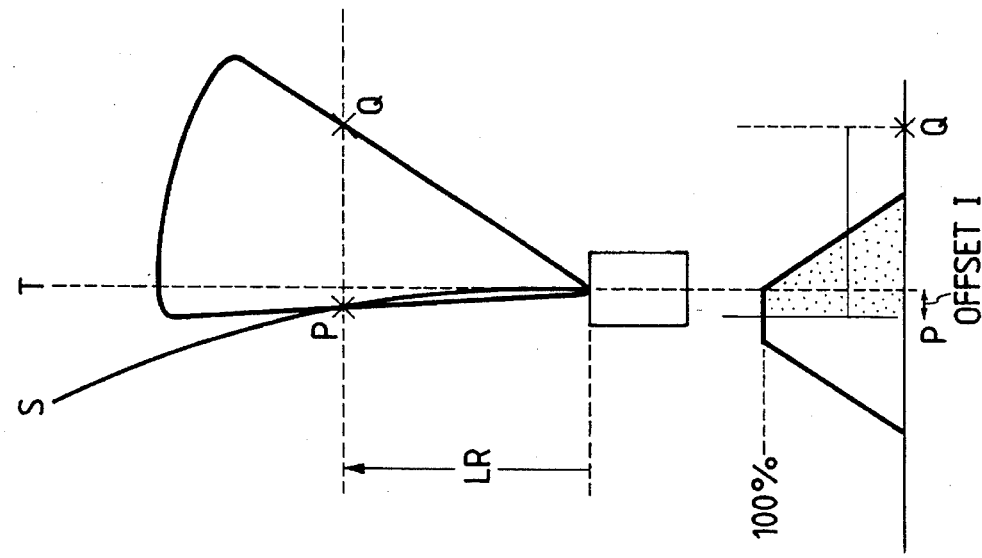
FIG. 15 is an illustration which shows a location of distribution of probability that an object detected by a left intervehicle distance sensor may be identified as a preceding vehicle traveling on the same traffic lane as a controlled vehicle when traveling on a curved road.

In steps 208 to 214, a second preceding vehicle probability at a location of the distance LL ahead of the intervehicle distance sensor 8b, as shown in FIG. 15, is determined in the same manner as in steps 200 to 206.

Figure 16:
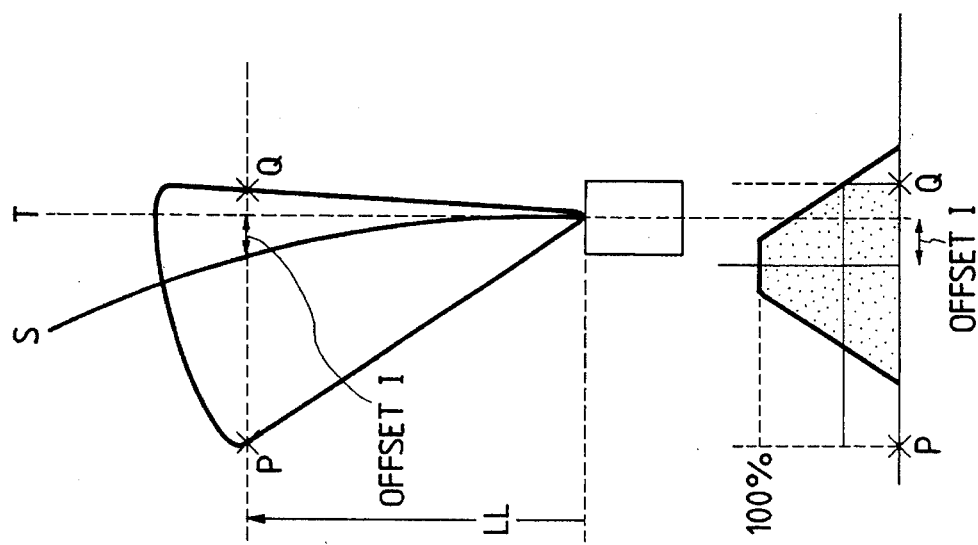
FIG. 16 is an illustration which shows a location of distribution of probability that an object detected by a right intervehicle distance sensor may be identified as a preceding vehicle traveling on the same traffic lane as a controlled vehicle when traveling on a curved road.

Similarly, in steps 216 to 222, a third preceding vehicle probability at a location of the distance LR ahead of the intervehicle distance sensor 8c, as shown in FIG. 16, is determined in the same manner as in steps 200 to 206.

Subsequently, the routine proceeds to step 224 wherein the highest probability is selected from among the first, second, and third preceding vehicle probabilities to determine which of the intervehicle distance sensors assumes that probability.

The routine then proceeds to step 226 wherein distance data provided by the intervehicle distance sensor selected in step 224 is used to determine a target change rate of speed Tr in the same manner as in step 132 of the first embodiment. After step 226, the same operations as in the first embodiment are performed.

According to the second embodiment, the detection accuracy that an object detected may be identified as a preceding vehicle traveling on the same traffic lane as the system vehicle, is further improved. The intervehicle distance control is thus, performed with higher accuracy.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to he shown embodiments which can be embodied without departing from the principle of the invention as set forth in the appended claims.

What is claimed is:

1. A system for detecting a preceding vehicle present ahead of a system vehicle equipped with the system, the system comprising:

distance determining means for deriving distance data representing a distance between the system vehicle and an object detected ahead of the system vehicle if the detected object is within a preselected detection range;

curve determining means for determining curve data based on factors including a degree of a curve in a road on which the system vehicle is traveling;

probability distribution defining means for defining a probability distribution based on factors including a degree of a curve in the road and a distance between the detected object and the system vehicle, the probability distribution indicating a higher probability when the detected object is located at a central portion of a lane on which the system vehicle is traveling than when the detected object is located away from the central portion of the lane in a lateral direction;

probability determining means for determining a probability that the detected object is a preceding vehicle based on factors including the distance data derived by the distance determining means, the curve data determined by the curve determining means, and the probability distribution defined by the probability distribution defining means; and change rate of speed determining means for determining a target change rate of speed of the system vehicle based on factors including a preselected relationship between the target change rate of speed and the probability determined by the probability determining means.

2. A system as set forth in claim 1, wherein the distance determining means radiates one of a laser beam and electromagnetic wave in a forward direction to measure the distance to the object detected ahead.

3. A system as set forth in claim 1, wherein the curve determining means determines a radius of curvature of the curve in the road based on a steered angle and a vehicle speed of the system vehicle.

4. A system as set forth in claim 1, wherein the probability distribution defining means includes means for defining parameters of the probability distribution used to determine if the detected object is the preceding vehicle moving in the same lane as the system vehicle, and means for correcting the probability distribution based on factors including the curve data derived by the curve determining means, the probability determining means including means for determining the probability that the detected object is the preceding vehicle moving in the same lane as the system vehicle based on factors including the corrected probability distribution.

5. A system as set forth in claim 1, wherein the preselected detection range of the distance determining means has a center line substantially coinciding with an extended longitudinal center line of the system vehicle, and wherein the preselected detection range extends ahead of the system vehicle, the probability distribution defining means includes means for defining the probability distribution having a central zone extending across a center line corresponding to the center line of the detection range of the distance determining means and side zones located adjacent to the central zone and means for shifting the center line of the probability distribution based on factors including the curve data determined by the curve determining means, the central zone indicating a higher probability than the side zones, the probability determining means including means for determining the probability that the detected object is a preceding vehicle based on a ratio of the shifted probability distribution falling within lateral detection limits of the detection range of the distance determining means defined at a location of the distance to the detected object away from the system vehicle in a lateral direction perpendicular to the central line of the detection range.

6. A system as set forth in claim 1, wherein the distance determining means includes a plurality of distance determining sensors, the probability determining means determining the probability based on each distance data derived by the distance determining sensors and selecting the highest probability from among the probabilities provided for every distance determining sensor, the change rate of speed determining means determining the target change rate of speed of the system vehicle based on the highest probability.

7. A system for controlling the speed of a system vehicle equipped with the system to a desired speed according to an object present ahead of the system vehicle, the system comprising:

distance determining means for determining a distance to an object present in a given forward detectable range;

curvature determining means for determining a curvature of a road on which the system vehicle is moving;

preceding vehicle probability distribution defining means for defining a probability distribution which represents a higher probability parameter when the object in the given forward detectable range is located at a central portion of a lane on which the system vehicle is traveling than when the object is located in a lateral direction from the central portion of the lane;

preceding vehicle probability determining means for determining a probability that the object is a preceding vehicle traveling ahead of the system vehicle based on factors including the distance determined by the distance determining means, the curvature determined by the curve determining means, and the probability distribution defined by the probability distribution defining means;

target speed determining means for determining a target speed based on factors including the probability determined by the preceding vehicle probability determining means; and speed control means for controlling the speed of the system vehicle based on factors including the target speed determined by the target speed determining means.

8. A system as set forth in claim 7, wherein the preceding vehicle probability determining means determines the probability that the object is the preceding vehicle traveling ahead of the system vehicle when a variation in the distance to the object determined by the distance determining means is smaller than a preselected threshold value.

9. A system as set forth in claim 7, wherein the preceding vehicle probability determining means determines the probability that the object is the preceding vehicle traveling ahead of the system vehicle when a variation in the distance to the object determined by the distance determining means is smaller than a first threshold value and a variation in relative speed between the object and the system vehicle is smaller than a second threshold value.

10. A system as set forth in claim 7, wherein the preceding vehicle probability distribution defining means includes means for defining parameters of the probability distribution used for determining whether the object is a preceding vehicle moving in the same lane as the system vehicle, and means for correcting the probability distribution based on factors including the curvature determined by the curvature determining means, the preceding vehicle probability determining means including means for determining the probability that the object present ahead is the preceding vehicle moving in the same lane as the system vehicle based on factors including the corrected probability distribution.

11. A system as set forth in claim 10, wherein the probability distribution is shifted to an extent corresponding to an interval between a center line of a curvature of the road and the center line of forward detectable range at the location of the distance of the object away from the system vehicle.

12. A system as set forth in claim 10, wherein the preceding vehicle probability determining means includes means for determining the probability that the object is the preceding vehicle traveling ahead of the system vehicle by averaging random variables in the shifted probability distribution within detection limits of the forward detectable range of the distance determining means defined at the location of the distance to the object away from the system vehicle in the lateral direction perpendicular to the central line of the forward detectable range.

13. A system as set forth in claim 7, wherein the forward detectable range of the distance determining means has a center line substantially coinciding with an extended longitudinal center line of the system vehicle, and wherein the preselected detection range extends ahead of the system vehicle, the preceding vehicle probability distribution defining means including means for defining the probability distribution having a central zone extending across a center line corresponding to the center line of the forward detectable range of the distance determining means and side zones located adjacent to the central zone and means for shifting the center line of the probability distribution based on factors including the curvature determined by the curvature determining means, the central zone representing a higher probability parameter than the side zones, the preceding vehicle probability determining means including means for determining the probability that the object is a preceding vehicle based on factors including a ratio of the shifted probability distribution falling within lateral detection limits of the forward detectable range of the distance determining means defined at a location of the distance to the object away from the system vehicle in a lateral direction perpendicular to the central line of the forward detectable range.

14. A system as set forth in claim 7 further comprising object identifying means for determining that there is no object in said forward detectable range of said distance determining means when a variation in said distance to the object determined by said distance determining means is greater than a preselected value, said speed control means controlling said speed of the system vehicle at a predetermined rate based on a target speed selected manually by a vehicle operator.

15. A system as set forth in claim 7 further comprising object identifying means for identifying the object in the forward detectable range of the distance determining means as an object other than a vehicle when a variation in the distance to the object determined by the distance determining means is less than a first preselected value and a variation in relative speed between the object and the system vehicle is greater than a second preselected value, wherein the speed control means includes means for decreasing the speed of the system vehicle at a constant rate when the object in the forward detectable range is identified as the object other than the preceding vehicle and the distance to the object is less than a third preselected value and means for decreasing the speed of the system vehicle at a smaller rate than the constant rate when the object in the forward detectable range is identified as an object other than the preceding vehicle and the distance to the object is greater than the third preselected value.

16. A system as set forth in claim 7, wherein the curvature determining means determines the curvature of the road on which the system vehicle is moving in a given relation to a steered angle and vehicle speed of the system vehicle.

17. A system as set forth in claim 7, wherein the distance determining means includes a plurality of distance sensors, the preceding vehicle probability determining means determining the probability based on each distance to the object determined by the distance sensors and selecting the highest probability from among the probabilities provided for every distance sensor, the target speed determining means determining the target speed of the system vehicle based on the highest probability.

18. A system for controlling the speed of a system vehicle equipped with the system to a desired speed according to an object present ahead of the system vehicle, the system comprising:

distance determining means for determining a distance to an object present in a given forward detectable range;

curvature determining means for determining a curvature of a road on which the system vehicle is moving;

preceding vehicle probability distribution defining means for defining a probability distribution which represents a higher probability parameter when the object in the given forward detectable range is located at a central portion of a lane on which the system vehicle is traveling than when the object is located in a lateral direction from the central portion of the lane;

preceding vehicle probability determining means for determining a probability that the object is a preceding vehicle traveling ahead of the system vehicle based on factors including the distance determined by the distance determining means, the curvature determined by the curve determining means, and the probability distribution defined by the probability distribution defining means;

target speed determining means for determining a target speed based on factors including the probability determined by the preceding vehicle probability determining means; and speed control means for controlling the speed of the system vehicle based on factors including the target speed determined by the target speed determining means, wherein the target speed determining means includes means for determining a basic change rate of speed for the system vehicle based on factors including a preselected relationship with a difference between the distance to the object and a target distance to the object and a relative speed between the system vehicle and the object, and means for correcting the basic change rate of speed using at least a correction value that is defined based on factors including the probability determined by the preceding vehicle probability determining means and the relative speed to determine the target speed.

19. A system for controlling the speed of a system vehicle equipped with the system to a desired speed according to an object present ahead of the system vehicle, the system comprising:

distance determining means for determining a distance to an object present in a given forward detectable range;

curvature determining means for determining a curvature of a road on which the system vehicle is moving;

preceding vehicle probability distribution defining means for defining a probability distribution which represents a higher probability parameter when the object in the given forward detectable range is located at a central portion of a lane on which the system vehicle is traveling than when the object is located in a lateral direction from the central portion of the lane;

preceding vehicle probability determining means for determining a probability that the object is a preceding vehicle traveling ahead of the system vehicle based on factors including the distance determined by the distance determining means, the curvature determined by the curve determining means, and the probability distribution defined by the probability distribution defining means;

target speed determining means for determining a target speed based on factors including the probability determined by the preceding vehicle probability determining means; and speed control means for controlling the speed of the system vehicle based on factors including the target speed determined by the target speed determining means, wherein the target speed determining means includes means for determining a basic change rate of speed for the system vehicle based on a preselected relationship with a difference between the distance to the object and a target distance to the object and a relative speed between the system vehicle and the object, and means for correcting the basic change rate of speed using at least a first correction value defined based on factors including the probability determined by the preceding vehicle probability determining means and the relative speed and a second correction value defined based on factors including the distance to the object to determine the target speed.

20. A system as set forth in claim 19, wherein the first correction value is so defined as to decrease the target speed as the probability determined by the preceding vehicle probability determining means is decreased and the relative speed is increased in a direction where the object moves away from the system vehicle, the second correction value being so defined as to decrease the target speed when the distance to the object is increased.

21. A system as set forth in claim 19, wherein the speed control means reduces the speed of the system vehicle to the target speed determined by said target speed determining means by closing a throttle valve when a difference between the target speed and an actual vehicle speed is greater than a first predetermined value in a direction of deceleration.

22. A system as set forth in claim 21, wherein the speed control means reduces the speed of the system vehicle to the target speed determined by said target speed determining means by changing gear to a higher ratio in addition to the closing the throttle valve when the difference between the target speed and the actual vehicle speed is greater than a second predetermined value greater than the first predetermined value in the direction of deceleration.

23. A system as set forth in claim 22, wherein the speed control means changes gear from the higher ratio to an initial ratio when the difference between the target speed and the actual vehicle speed becomes less than a third predetermined value smaller than the first predetermined value in the direction of deceleration.

24. A system as set forth in claim 23, wherein the speed control means opens the throttle valve when the difference between the target speed and the actual vehicle speed becomes less than a fourth predetermined value smaller than the third predetermined value in the direction of deceleration.

25. A system for detecting a probability of a preceding vehicle ahead of a system vehicle equipped with the system, the system comprising:

distance determining means for determining a distance between the system vehicle and an object detected ahead of the system vehicle and located within a preselected detection range;

curve determining means for determining a degree of a curve in a road on which the system vehicle is traveling;

probability distribution defining means for defining a probability distribution which indicates a higher probability when the object is present at a central portion of a lane in which the system vehicle is traveling than when the object is away from the central portion of the lane in a lateral direction; and probability determining means for determining a probability that the object is a preceding vehicle based on factors including the distance derived by the distance determining means, the degree of the curve determined by the curve determining means, and the probability distribution defined by the probability distribution defining means, the probability determining means providing a signal based on the determined probability.

26. A system as set forth in claim 25, wherein the probability distribution defining means includes means for defining parameters of the probability distribution used for determining whether the object located within the detection range of the distance determining means is a preceding vehicle moving in the same lane as the system vehicle, and means for correcting the probability distribution based on the degree of the curve derived by the curve determining means, the probability determining means including means for determining the probability that the object present ahead is the preceding vehicle moving in the same lane as the system vehicle based on factors including the corrected probability distribution.

27. A system as set forth in claim 26, wherein the probability distribution defining means includes means for shifting a center line of the probability distribution by an interval between a center line of the curve and an extended longitudinal center line of the system vehicle on a line extending perpendicular to the extended longitudinal center line of the system vehicle at a location where the object is present within the preselected detection range.

28. A system as set forth in claim 25, wherein the probability distribution defining means includes means for defining probability parameters which are decreased according to an increase in the degree of the curve.

29. A system as set forth in claim 27, wherein the probability distribution defining means includes means for defining probability parameters relative to an increase in the distance to the object.

30. A system as set forth in claim 25, wherein the preselected detection range of the distance determining means has a center line substantially coinciding with an extended longitudinal center line of the system vehicle and extending ahead of the system vehicle, the probability distribution defining means including means for defining the probability distribution having a central zone extending across a center line corresponding to the center line of the detection range of the distance determining means and side zones being located adjacent the central zone where the central zone indicates a higher probability than the side zones, and means for shifting the center line of the probability distribution based on factors including the degree of the curve determined by the curve determining means, and the probability determining means including means for determining the probability that the object detected in the preselected detection range of the distance determining means is the preceding vehicle based on a ratio of the shifted probability distribution falling within lateral detection limits of the detection range of the distance determining means defined at a location of the distance to the object away from the system vehicle in a lateral direction perpendicular to the central line of the detection range.

* * * * *